(12) United States Patent
Gonidec

(10) Patent No.: US 9,816,301 B2
(45) Date of Patent: Nov. 14, 2017

(54) LOCKING DEVICE WITH MECHANICAL DETECTION OF CLOSING AND OPENING

(71) Applicant: AIRCELLE, Gonfreville l'Orcher (FR)

(72) Inventor: Patrick Gonidec, Bretx (FR)

(73) Assignee: AIRCELLE, Gonfreville l'Orcher (FR)

( * ) Notice: Subject to any disclaimer, the term of this patent is extended or adjusted under 35 U.S.C. 154(b) by 458 days.

(21) Appl. No.: 14/187,770

(22) Filed: Feb. 24, 2014

(65) Prior Publication Data
US 2014/0225380 A1 Aug. 14, 2014

Related U.S. Application Data

(63) Continuation of application No. PCT/FR2012/051875, filed on Aug. 9, 2012.

(30) Foreign Application Priority Data

Aug. 22, 2011 (FR) .................................. 11/57429

(51) Int. Cl.
*E05C 5/00* (2006.01)
*E05C 19/12* (2006.01)
(Continued)

(52) U.S. Cl.
CPC .............. *E05C 19/12* (2013.01); *B64D 29/06* (2013.01); *E05B 41/00* (2013.01); *E05C 1/006* (2013.01); *Y10T 292/0936* (2015.04)

(58) Field of Classification Search
CPC ......... E05C 19/12; E05C 1/006; B64D 29/06; E05B 41/00; Y10T 292/0936
(Continued)

(56) References Cited

U.S. PATENT DOCUMENTS

| 4,040,652 A * | 8/1977 | Arfelt ..................... E05B 41/00 |
|---|---|---|
| | | 292/167 |
| 6,279,971 B1 * | 8/2001 | Dessenberger, Jr. ... E05B 41/00 |
| | | 244/129.4 |

(Continued)

FOREIGN PATENT DOCUMENTS

| EP | 0 480 827 A1 | 4/1992 |
|---|---|---|
| EP | 1 091 059 A2 | 4/2001 |

(Continued)

OTHER PUBLICATIONS

International Search Report issued Feb. 6, 2013 in International Application No. PCT/FR2012/051875.

Primary Examiner — Matthieu F Setliff
Assistant Examiner — Thomas L Neubauer
(74) Attorney, Agent, or Firm — Burris Law, PLLC

(57) ABSTRACT

A locking device includes a locking pair having a bolt to engage with a retainer and a detection linkage. The bolt is movably mounted against a spring which tends to return the bolt to a position spaced apart from the retainer. The detection linkage is also movably mounted between an unlocked position where the detection linkage allows unlocking of the bolt and the retainer. In particular, a portion of the bolt then engages with the detection linkage by means of a detecting part of the detection linkage to block a possible return of the detection linkage towards a locked position where the detection linkage engages with the portion of the bolt so as to oppose to unlocking of the bolt. The detecting part irreversibly drives the detection linkage to its unlocked position even when one locking pair is unlocked.

15 Claims, 6 Drawing Sheets

(51) Int. Cl.
*B64D 29/06* (2006.01)
*E05B 41/00* (2006.01)
*E05C 1/00* (2006.01)

(58) Field of Classification Search
USPC .......................................................... 292/137
See application file for complete search history.

(56) References Cited

U.S. PATENT DOCUMENTS

| | | | |
|---|---|---|---|
| 6,824,175 B2* | 11/2004 | Porte | B64D 29/06 244/129.4 |
| 2004/0104583 A1 | 6/2004 | Porte | |
| 2006/0038410 A1* | 2/2006 | Pratt | B64D 29/06 292/144 |

FOREIGN PATENT DOCUMENTS

| | | |
|---|---|---|
| FR | 2 966 488 A1 | 4/2012 |
| GB | 17739 A | 3/1916 |

* cited by examiner

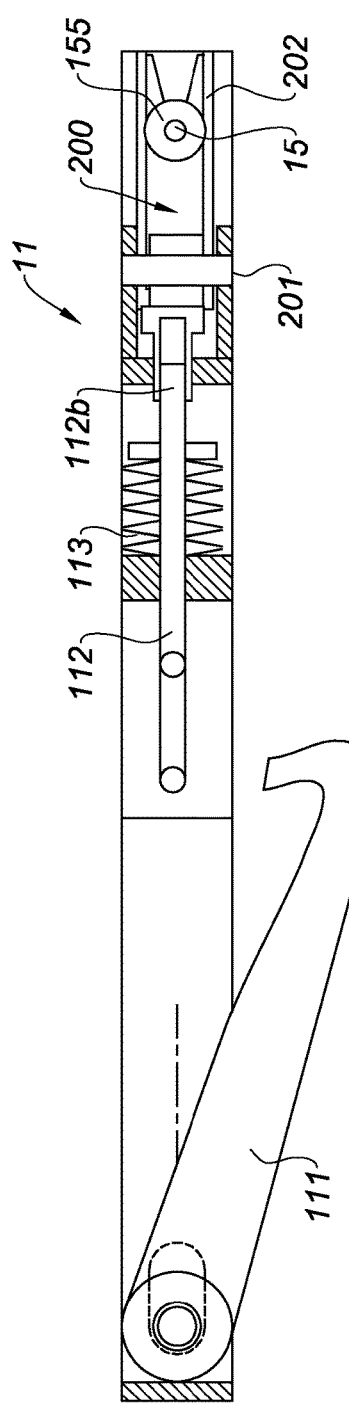
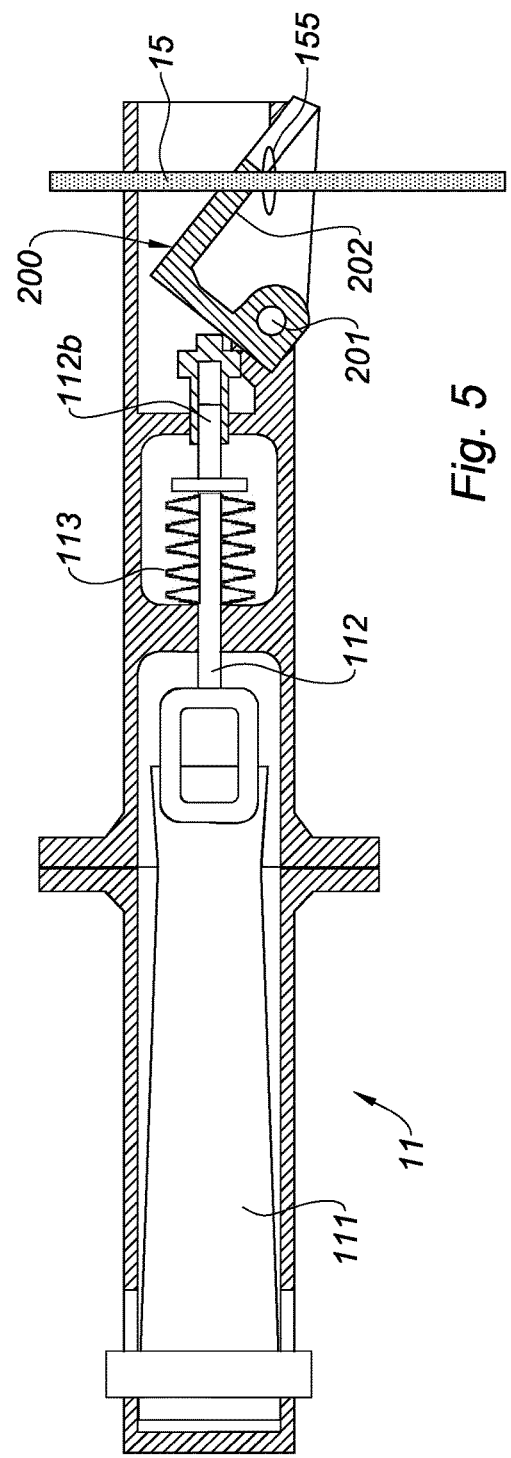

LOCKING DEVICE WITH MECHANICAL DETECTION OF CLOSING AND OPENING

CROSS-REFERENCE TO RELATED APPLICATIONS

This application is a continuation of International Application No. PCT/FR2012/051875, filed on Aug. 9, 2012, which claims the benefit of FR 11/57429, filed on Aug. 22, 2011. The disclosures of the above applications are incorporated herein by reference.

FIELD

The present disclosure relates to a locking system including a mechanical system for detecting closure and opening of a locking system.

BACKGROUND

The statements in this section merely provide background information related to the present disclosure and may not constitute prior art.

An aircraft nacelle is designed to encase a turbojet engine and produce the thrust of the turbojet engine by channelling the flows generated by the engine. It must also be possible to open said nacelle to access the engine and its equipment.

Most turbojet nacelles comprise a fan cowl which encases the engine fan casing and a rear body (often a thrust reverser) which encases the central part of the engine.

To provide access to the engine and its equipment, both nacelle components generally open into two halves.

Said doors or cowls can be opened by means of hinges, usually mounted on the upper part of the nacelle, in a so-called twelve o'clock position, along a mast line, and are held closed by a plurality of locks mounted generally along a locking line on the lower part of the nacelle in a so-called six o'clock position.

It is understandably essential to close all locks after every maintenance operation.

To this end, all removable cowls of a nacelle must be efficiently, safely and rapidly locked before a nacelle is put into operation. Currently, this safety check depends in most cases almost entirely on the vigilance of the mechanic who carries out the locking operation. As a result, maintenance errors have caused a significant number of faulty closures of fan cowls, sometimes causing major in-flight events, (opening and loss of fan cowl). A clear indicator signalling that the nacelle cowl is locked will be a source of significant improvement in flight safety.

One of the most frequent causes of inflight openings is the partial opening or closing of the cowl latches. In this case, it is often difficult to notice that one or more latches are not properly closed during a routine check, because locking a single latch "secures" the cowl, which then seem to be properly closed when seen from a distance.

Thus, to provide an efficient detection system, it must be impossible to start unlocking or partially unlock the cowl without a corresponding status indicator displays an unlock status.

Of course, such considerations also apply to nacelles which are not fitted with thrust reversers, known as smooth nacelles, and which comprise movable cowls to access the nacelles in the same way, and also to other maintenance cowls equipping the nacelle.

There is therefore a need for a closure detecting system which meets the above-mentioned requirements.

Such electrical locking detection systems making it possible to perform a visual control of the situation are well-known. However, such systems require a power supply source and are subject to possible electrical faults.

However, one of the difficulties associated with a mechanical system lies in providing that the unlocking indicator displays clearly an unlock status when a first latch is opened and, conversely, that said indicator does not switch to the lock status unless strictly all latches are locked.

Moreover, the existing mechanical systems only monitor the position of the latch handle, while the desired mechanical function is that of pressing the latches.

To this end, Document FR 2 966 488 discloses a device for locking between a first structure and a second structure comprising at least one locking pair comprising at least one bolt linked to the first structure and adapted to engage with at least one corresponding retaining means, linked to the second structure, the bolt being further mounted movable against at least one elastic return means that tends to return it in a position spaced apart from the retaining means, said locking device comprising at least one detection linkage, movably mounted between a first position wherein it makes it possible to unlock the bolt and the retaining means, at least a part of the bolt then engaging with the linkage to block a possible return of said linkage to a second position, and said second position wherein the linkage engages with at least a part of the locking pair to block the unlocking thereof.

By providing a linkage blocked in position by the bolt when the locking pair is unlocked, the linkage cannot return to its second position, indicating that the device is locked, unless the locking pair is actually relocked. In the case of a plurality of locking pairs with linkages connected together, said linkages cannot return to their second position indicating that the associated locking pair is relocked unless all locking pairs have been relocked.

Conversely, for the unlocking operation, by providing a linkage element engaging with part of a locking pair to block the unlocking of said pair, it is necessary to switch the linkage to its first position, thus indicating the unlocking, to effectively unlock the locking pair.

Thus, with such a device, a status indicator associated with the linkage will always indicate the status of the locking pairs and block any status change that is not passed on to said status indicator.

Implementation and development studies have shown that several aspects of this locking system could still be improved.

The preceding device provides in particular that the indicator, and more generally the associated linkage, must be switched to the unlocking position to effectively unlock the latches.

This can be a source of potential annoyance for the operator during maneuverings.

SUMMARY

The present disclosure provides a device for locking between a first structure and a second structure, comprising at least a locking pair which comprises at least one bolt linked to the first structure and adapted to engage with at least one corresponding retaining means, linked to the second structure, the bolt being further movably mounted against at least one elastic return means which tends to return it in a position spaced apart from the retaining means, said locking device further comprising at least one detection linkage, movably mounted between a first, so called unlocked position, wherein it makes it possible to unlock the bolt and the retaining means, at least a part of the bolt then engaging with the linkage, to block a possible return of the linkage to a second position, and said second, so-called locked position, wherein the linkage is engaged with said part of the bolt as to block its unlocking, wherein the part of the bolt engages with the linkage by means of at least a detection part of the linkage, said part being movably mounted between a first, so-called locked position, corresponding to the locking of the locking pair in wherein it allows the locked position of the linkage and is adapted to be driven by the bolt towards an unlocked position wherein it irreversibly drives the linkage to its own unlocked position, the switching of the linkage to the unlocked position being provided when a first latch is opened.

What is meant by locking pair is a pair of bolt and hook elements forming a latch assembly.

Thus, by combining the device according to document FR 2 966 488, a detecting part irreversibly driven by the bolt, the bolt opening automatically drives the linkage, and as a consequence, an associated indicator, to an unlocked position.

It should be noted that the associated indicator can be implemented in several ways. It may, for example, be a mechanical system, using the movement of the linkage, or an electrical system using linkage proximity sensors and sending a corresponding electrical signal to LEDs, for example.

What is meant by irreversible drive is that during the unlocking of the bolt, it drives the detection part from its locked position to the unlocked position and, as a result, drives the linkage to its own unlocked position, but that a return of the bolt, and/or of the detection part to its locked position does not in itself drive the return of the linkage to its locked position.

Thus, the unlocking movement is intrinsically linked to the linkage and any unlocking of a locking pair will cause the linkage to switch to its corresponding position.

In contrast, the locked return of the locking pair is separated from the linkage, which cannot therefore return to its locking position unless all locking pairs are locked.

Advantageously, the detecting part is engaged with the linkage by means of a fork adapted to cooperate with a corresponding shoulder of the linkage. During switching, the fork presses on the shoulder and drivers the linkage. In contrast, the return of the fork does not exert any force on the shoulder and does not therefore drive back the linkage to its position.

Advantageously, the detecting part is pivotally mounted to switch between its first and second position.

In one form, the linkage is mounted against an elastic element which tends to bring it back to the locked position.

In another form, the detection part abuts against a part of the bolt.

According to a first form, the bolt has the shape of a bracket.

According to a second complementary or alternative form, the retaining means has the shape of a hook.

Advantageously, the bolt is adapted to drive the detection part by means of an axially traveling movable rod.

Further advantageously, the movable rod is mounted with the bolt.

In still another form, the device comprises several locking pairs, arranged in particular along a locking line, the associated linkages being interconnected by means of at least one mechanical transmission.

The present disclosure also relates to a movable cowl, characterized in that it comprises at least one associated locking device according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4 and 5 are longitudinal sectional views of respectively top and side of the unlocking pair in FIGS. 2 and 3, in an unlocked position;

DETAILED DESCRIPTION

Figure 1:
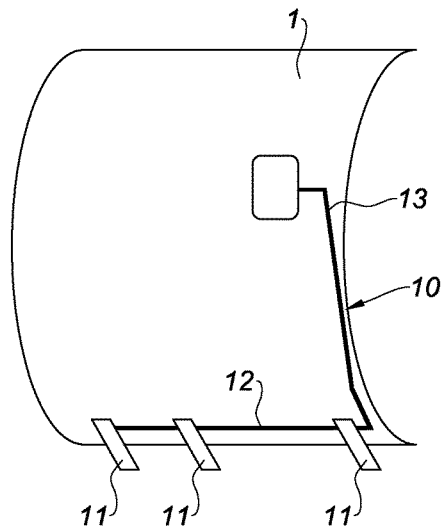
FIG. 1 is a schematic representation of a nacelle movable cowl fitted with a locking device according to the present disclosure.
Figure 2:
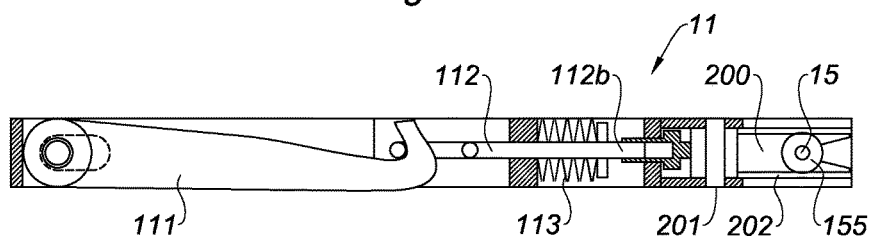
FIGS. 2 and 3 are longitudinal sectional views respectively of the top and side of the locking pair according to the device in FIG. 1, in a locked position.
Figure 3:
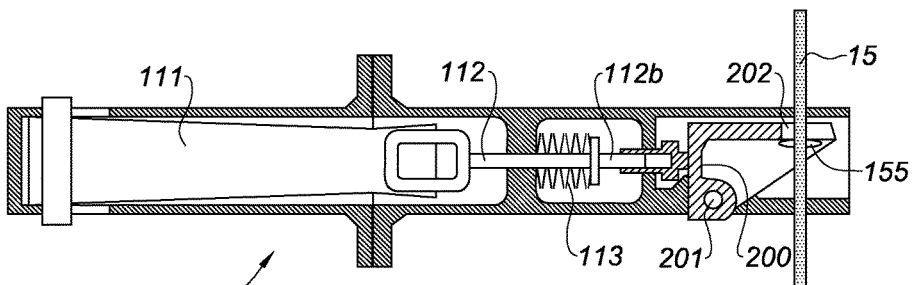

The following description is merely exemplary in nature and is not intended to limit the present disclosure, application, or uses. It should be understood that throughout the drawings, corresponding reference numerals indicate like or corresponding parts and features.

A locking device disclosed in document FR 2 966 488 comprises a plurality of locking pairs having a linkage connected to a status indicator (locked/unlocked).

Such a locking pair conventionally consists of a bolt having the shape of a bracket adapted to cooperate with a corresponding hook forming a retaining means for the bolt.

The bracket has a rod with which it is movably and translatably mounted between a locking position wherein it can engage with the hook and an unlocking position wherein it is spaced apart from the hook. In addition, the bracket is mounted against an elastic return means in the form of a spring which tends to return it to the unlocked position.

The locking pair is coupled to a movable detection linkage between a first position wherein it makes it possible to unlock the bracket and the hook and a second position wherein the linkage engages with at least a portion of the locking pair to block its unlocking.

To this end, the linkage comprises a first movable element translatably mounted along a direction substantially transverse to the locking pair and having the shape of a rod having a transverse lumen, arranged such that when the linkage is in its first position allowing the unlocking, the bracket rod penetrates into the lumen of the rod which then serves as a stop for the latter, and that when the linkage is in its second position corresponding to the locking of the locking pair, the rod serves as a stop for the bracket rod, preventing a possible recoil thereof.

The linkage also comprises a second movable element in the form of a locking pin movably mounted in a direction substantially transverse to the locking pair adapted to cooperate with the hook in particular through a small end-hook to prevent the unlocking of said hook. It should be noted that the locking pin is not intended to be a safe inflight locking means, and thus replace other defense lines to prevent the hook from opening, but holds said hook against accidental opening by an operator in accordance with the present disclosure.

The locking pin is connected to the rod by means of a pivot rocker providing that the locking pin is retracted when the rod is in a position allowing the unlocking and, vice versa, that the locking pin is engaged when the rod blocks the recoiling of the bracket.

A locking device according to the present disclosure will now be described in detail.

FIG. 1 shows a movable cowl of a turbojet engine nacelle (not shown). More specifically, it may be a fan cowl.

The cowl 1 is pivotably mounted around an upper hinge line (not shown) and is adapted to be locked at the lower part from a locking line along which a locking device according to the present disclosure is installed.

This locking device 10 comprises a plurality of locking pairs 11 having, in accordance with the present disclosure, a linkage 12 connected to a status indicator (locked/unlocked) 13.

A locking pair 11 and the operation thereof in accordance to the present disclosure are shown in detail in FIGS. 2 to 5.

A locking pair 11 typically comprises a bolt in the form of a bracket 112 and is adapted to cooperate with a corresponding hook 111 forming a retaining means for the bolt.

In a form according to the prior art, this bracket is generally fixed relative to the structure of the lock on which it is screwed.

In the present disclosure, the bracket 112 has a shaft 112b with which it is movably and translatably mounted between a locking position wherein it can engage with the hook 111 and an unlocking position wherein it is spaced part from the hook 111.

Furthermore, the bracket 112 is mounted against an elastic return means in the form of a spring 113 which tends to return it to the unlocked position.

According to the present disclosure, the locking pair 11 is coupled with a detection linkage 15.

This linkage 15 is in the form of a cable and is movable between a first position wherein it allows unlocking the bracket 112 and the hook 111 and a second position wherein the linkage engages with at least one part of the locking pair to block its unlocking.

All linkages 15 for each locking pair 11 form the linkage 12 of the system.

According to the present disclosure, the part of the bolt 112, more specifically its shaft 112b, engages with the linkage 15 by means of at least one detecting part 200 of the latter, said part 200 being movably mounted between a first said locked position corresponding to locking of the locking pair 11 wherein it allows the locked position of the linkage 15 and is adapted to be driven by the bolt 112 to an unlocked position wherein it irreversibly drives the linkage to its own unlocked position.

More specifically, the detection part 200 is in the form of a substantially triangular part adapted to tilt by rotating around an axis 201 substantially perpendicular to the linkage 15 and slightly offset from the axis of the shaft 112b of the bolt 112.

The detection part 200 engages with the linkage 15 by means of a fork 202 adapted to cooperate with a corresponding shoulder 155 of the linkage 15.

In the initial locked position, corresponding to a locking position of the locking pair 11 and the locking of the linkage 15, the detection part 200 abuts against the shaft 112b of the bolt 112 and the shoulder 155 of the linkage 15 abuts against the fork 202 of the detecting part 200.

When the bolt 112 is unlocked, the bolt and shaft 112b are pressed by the spring 113 towards a recessed unlocked position. In doing so, the shaft 112b of the bolt 112 pushes the detection part 200 and forces it to tilt around its pivot axis 201 to its unlocked position.

The pressure of the shaft 112b of the bolt 112 on the detecting part 200 exerts sufficient force to provide that during its tilting, the detection part 200, more precisely its fork 202 at the linkage 15 presses against the shoulder 155 of said linkage 15 and pulls it causing it to move back towards its unlocked position.

As long as the bolt 112 is unlocked, the shaft 112b of said bolt 112 will maintain the detection part 200 in a tilted unlocked position and prevent it from returning to its locked position. As a consequence, the linkage 15 cannot be brought back into the locked position as the fork 202 of the detecting part 200 blocks the shoulder 155 of the linkage 15 and thus prevents any movement of the latter to its locked position.

To allow the linkage 15 to return to the locked position, it is necessary to relock the bolt 112. In doing so, the shaft 112b of said bolt 112 is brought back into a recessed position and no longer blocks the return-tilting of the detection part 200 into its locked position. This return-tilting is carried out in particular by bringing the linkage 15 back to its locked position, with the shoulder 155 forcing the detection part 200 to return.

This tilting can be carried out automatically by providing the linkage 15 with an elastic return means. This elastic return means will of course have to be less stiff than the spring 113 of the bolt.

After having described in detail the operation of a locking pair 11, we will now describe the operation of a complete locking device 10.

Figure 6:
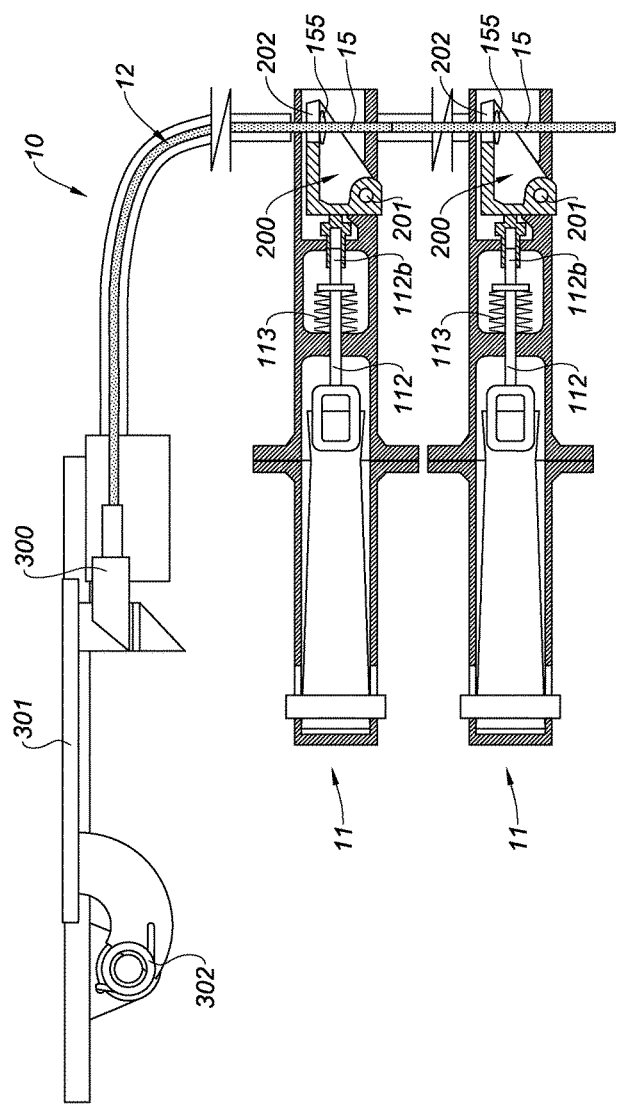
FIG. 6 is a general view of a locking device according to the present disclosure comprising two locking pairs in a locked position.

FIG. 6 is a schematic representation of such a locking device 10 comprising two locking pairs 11 as previously described, the linkage 12 being common between the two locking pairs 11 and connected at the end-portion to a latch 300 adapted to cooperate with an indicator panel 301 pivotally mounted against a spring 302 tending to force it to open.

Specifically, in a position indicating that the device is locked, the indicator panel 301 is retracted into the continuity of a nacelle wall and is held in this position by the latch 300.

Upon unlocking (FIG. 7), the latch 300 is retracted, thereby releasing the indicator panel 301 which swings and protrudes from said wall.

The latch 300 is mounted against an elastic return means 303 tending to return it and consequently also tending to return the linkage 12, 15 to a locked position.

Initially, as shown in FIG. 6, the two locking pairs 11 are in the locked position. The linkage 12, 15 is also in the locked position, the shoulders 155 at each locking pair 11 abutting against the fork 202 of the corresponding detection part 200.

The latch 300 is pushed by its spring 303 back into the locked position and thus secures the indicator panel 301 against the wall of the nacelle.

Figure 7:
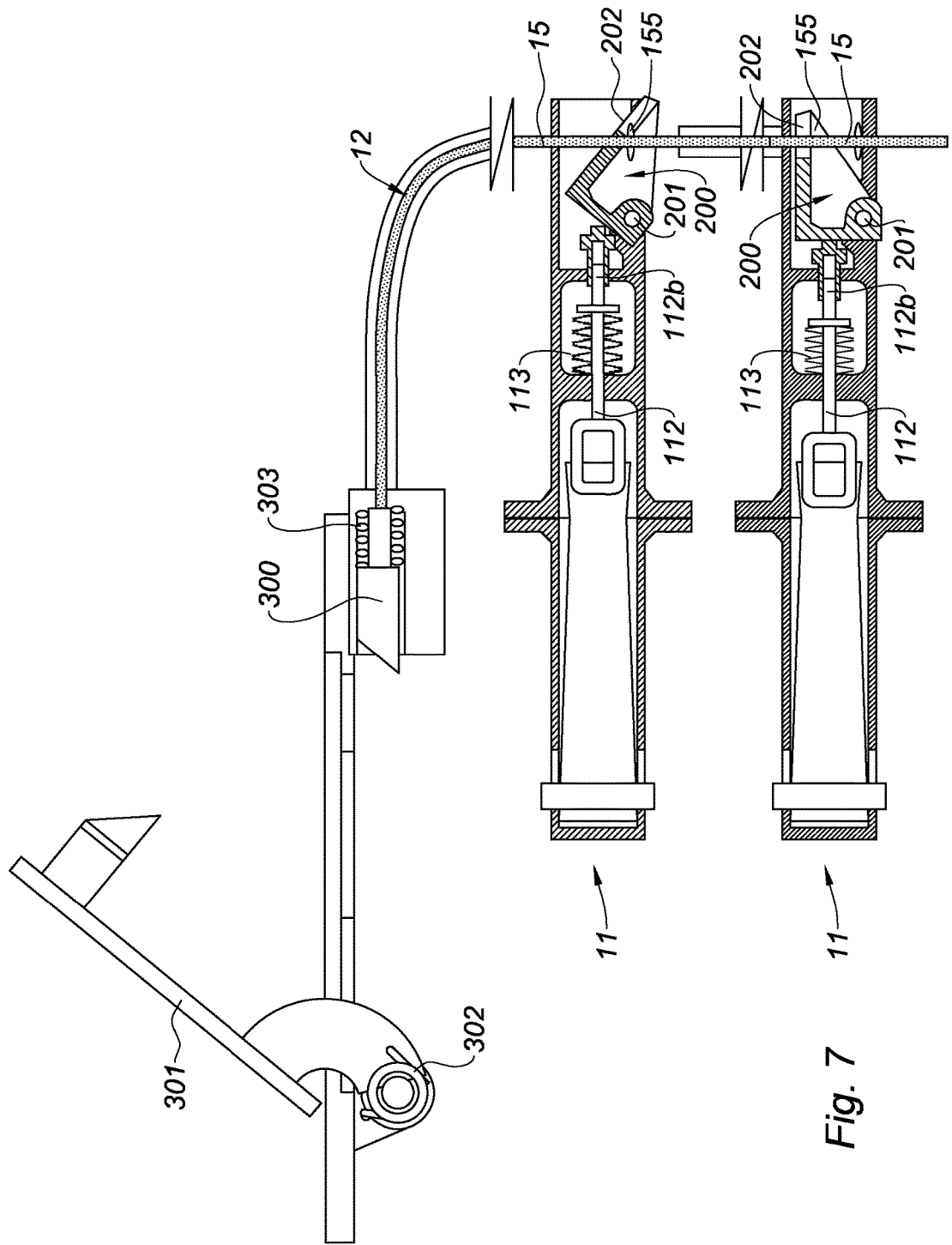
FIG. 7 is a view of the device in FIG. 6 wherein a locking pair is unlocked.

In FIG. 7, only one locking pair 11 was unlocked. The tilting of the detection part 200 of this locking pair 11 pulled the corresponding shoulder 155 and the linkage back into its unlocked position.

The latter being common with the second locking pair 11, the shoulder 155 of the second pair, 11 was also moved backwards.

In doing so, the backwards movement of the linkage 12, 15 causes the latch 300 to move against its spring 303, thereby releasing the indicator panel 301 which then protrudes from the wall of the nacelle.

The assembly is locked in this position as long as the unlocked locking pair 11 is not relocked.

In this position, it is not possible to return the indicator panel 301 against the wall of the nacelle. The latch 300 being retracted, said panel 301 automatically re-rotates out of the wall.

Figure 8:
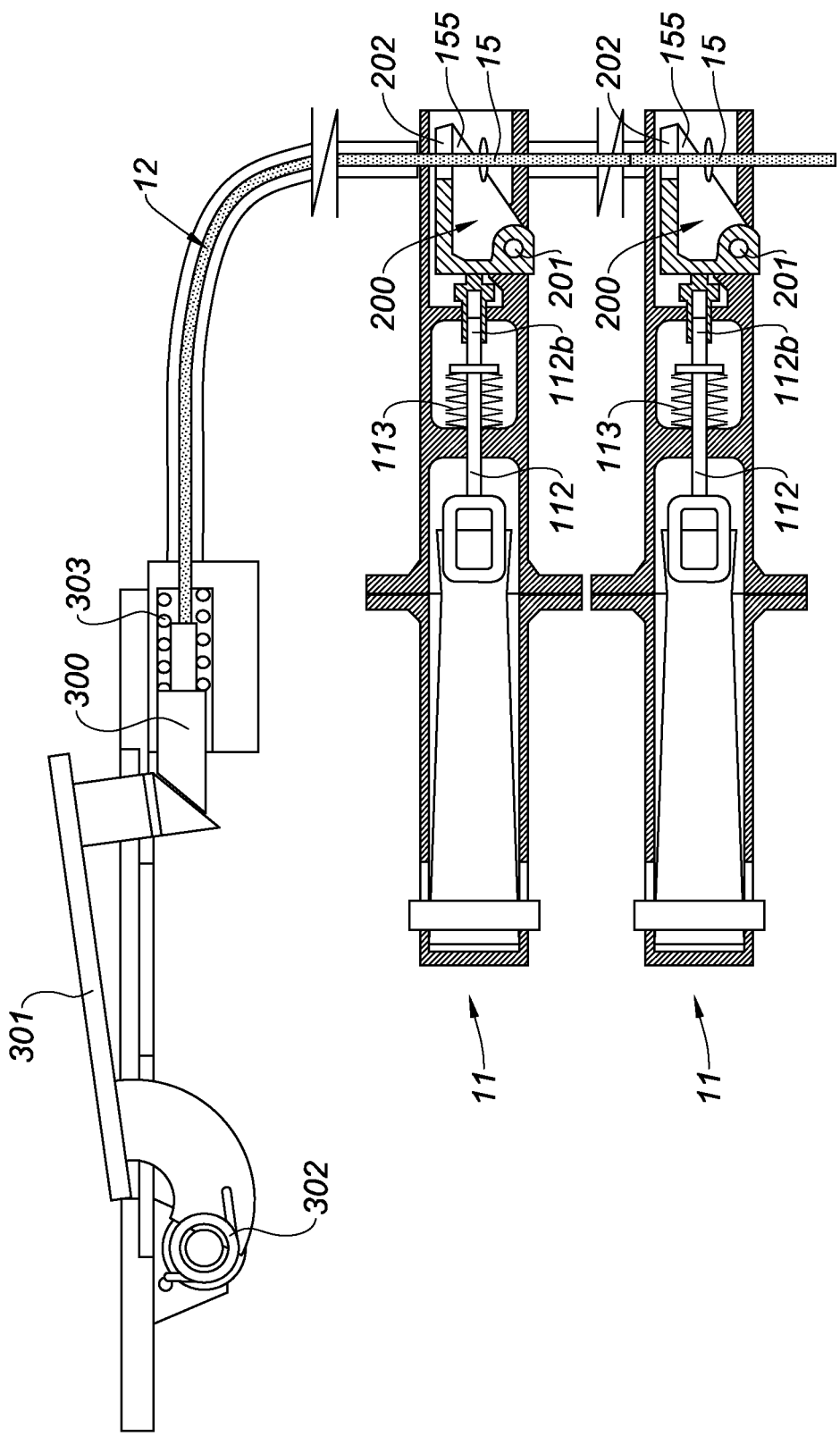
FIG. 8 is a view of the device of FIG. 6 during unlocking.

The relocking is illustrated in FIG. 8.

As explained above, the relocking of the locking pair 11 retracts the shaft 112b of the bolt 112 and allows the return of the detection part 200 into abutment against the latter in its locked position.

This return is caused by the shoulders 155 of the linkage 12, 15 forced into its locked position by the elastic return means 303 of the latch 300.

The indicator panel 301 is then brought manually against the wall of the nacelle and engages with the latch 300 with which it is held. This confirms relocking control by the operator.

Thus, in the device according to the present disclosure, the indicator panel 301 is tilted upon the unlocking of a locking pair 11 without the operator having to disarm the locking system 10 first. Thereafter, it is not possible to return the indicator panel 301 in its hidden position indicating relocking as long as relocking is not effective for all locking pairs 11

Figure 9:
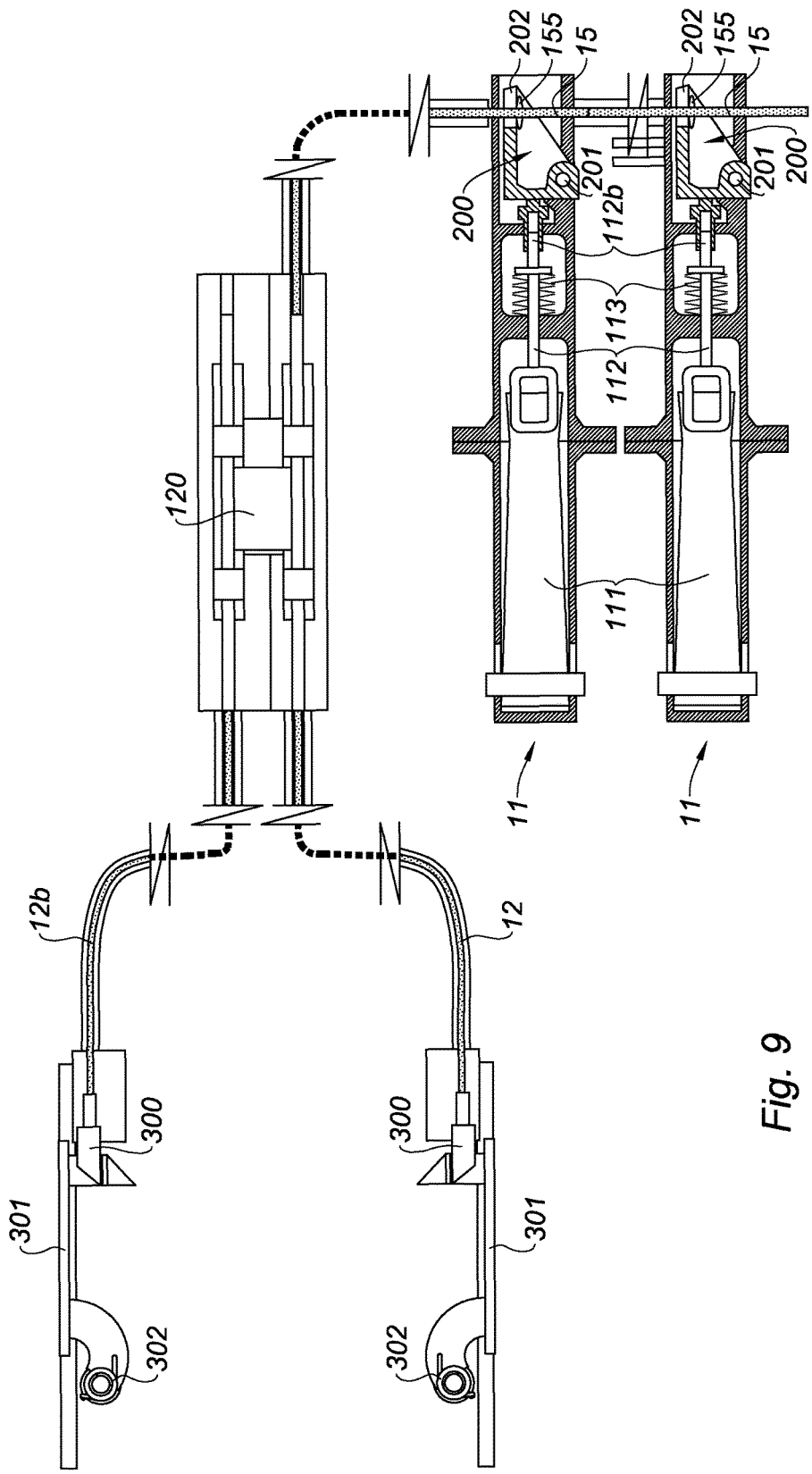
FIG. 9 is a schematic representation of a locking device according to the present disclosure with a lock indicator on both sides of a nacelle.

Advantageously, as shown in FIG. 9, it is interesting, in particular in the case of a nacelle, to provide indicator panels 301 on both sides of the nacelle so as, for example, to provide a visibility.

To this end, the linkage 12 will be fitted with a transmission cable swivel rod 120 transmitting the initial movement of the linkage 12 to one or more secondary linkages 12b connected to a latch 300 and a corresponding indicator panel 301.

Alternatively or in addition, the linkage 12 may also be coupled with an electrical detection system (for example, a proximity detector) which will send an indication of the position of the linkage 12 as an electric signal. This device can be used either alone or in parallel with the mechanical system described above.

Advantageously, the electrical detection will be doubled for safety reasons and sensors can advantageously be distributed along the linkage so as to detect any mechanical failures of the linkage Although the present disclosure was described based on a particular form, it is naturally in no way limited thereto and includes all technical equivalents of the means described as well as their combinations if these fall within the scope of the present disclosure. It is particularly obvious that it is not limited to the described indicator system and any lock or unlock status indicator system controlled directly or indirectly by the linkage is possible. Light indicators, etc., can also alternatively or complementarily be used.

What is claimed is:

1. A locking device for locking between a first structure and a second structure, said locking device comprising several locking pairs arranged along a locking line and connected by a linkage structure, each locking pair comprising at least one bolt connected to the first structure and adapted to engage with at least one corresponding retaining means which is connected to the second structure, the at least one bolt being further movably mounted against at least one elastic return means which tends to return the at least one bolt to a position spaced apart from the retaining means, said locking device further comprising an indicator connected to the linkage structure, the indicator providing an indication of a locked position and an unlocked position of all the locking pairs, the linkage structure including at least one detection linkage, the at least one detection linkage extending through the locking pairs to always connect the locking pairs together and to connect the locking pairs to the indicator, the linkage structure movably mounted between a unlocked position where the at least one detection linkage allows unlocking of the at least one bolt and the at least one corresponding retaining means, at least a portion of the at least one bolt then engaging with the detection linkage so as to block a possible return of said detection linkage towards a locked position where the detection linkage engages with said at least the portion of the at least one bolt so as to oppose unlocking of the at least one bolt, wherein said at least the portion of the at least one bolt engages with the detection linkage by means of at least one detecting part of said detection linkage, said at least one detecting part being movably mounted between a locked position, corresponding to the locking of the locking pair, where the at least one detecting part allows the locked position of the detection linkage and is adapted to be driven by the at least one bolt towards an unlocked position where the at least one detecting part drives the detection linkage to the unlocked position of the detection linkage, a shifting of the detection linkage to the unlocked position being thus provided when one locking pair is unlocked, wherein the indicator provides an indication if not all locking pairs are locked.

2. The locking device according to claim 1, wherein the at least one detecting part engages with the detection linkage through a fork adapted to cooperate with a corresponding shoulder of the detection linkage.

3. The locking device according to claim 1, wherein the at least one detecting part is pivotally mounted to tilt between a first and second positions.

4. The locking device according to claim 1, wherein the detection linkage is mounted against an elastic member which tends to bring the detection linkage back to the locked position.

5. The locking device according to claim 1, wherein in the locked position of the detection linkage, the at least one detecting part abuts against a portion of the at least one bolt.

6. The locking device according to claim 1, wherein the at least one bolt is in the form of a bracket for removably engaging a hook of the at least one corresponding retaining means.

7. The locking device according to claim 1, wherein the at least one corresponding retaining means has a shape of a hook.

8. The locking device according to claim 1, wherein the at least one bolt is adapted to drive the at least one detecting part by means of a translatably movable shaft.

9. The locking device according to claim 8, wherein the translatably movable shaft is movably mounted with the at least one bolt.

10. The locking device according to claim 1, wherein the indicator is a mechanical panel having a hidden position and a protruded position, wherein the panel cannot return to its hidden position if all locking pairs are not locked.

11. The locking device according to claim 1, wherein the indicator is electrical and uses linkage proximity sensors to send corresponding electrical signal to LEDs.

12. The locking device according to claim 1, wherein the at least one detection linkage has opposing ends, one of the opposing ends of the at least one detection linkage being removably connected to the indicator and the other of the opposing ends of the at least one detection linkage being connected to the locking pairs.

13. The locking device according to claim 1, wherein the one of the opposing ends of the at least one detection linkage is movable toward or away from the indicator.

14. The locking device according to claim 1, further comprising a latch connected to the one of the opposing ends of the at least one detection linkage.

15. The locking device according to claim 1, wherein the at least one detection linkage includes a cable extending through the locking pairs.

\* \* \* \* \*